Nov. 5, 1946.  J. LEDWINKA  2,410,402

AXLE SUSPENSION

Original Filed Sept. 17, 1943    2 Sheets-Sheet 1

INVENTOR
JOSEPH LEDWINKA

BY John P. Tarbos
ATTORNEY

Nov. 5, 1946.   J. LEDWINKA   2,410,402
AXLE SUSPENSION
Original Filed Sept. 17, 1943   2 Sheets-Sheet 2

INVENTOR
JOSEPH LEDWINKA
BY John P. Jenkins
ATTORNEY

Patented Nov. 5, 1946

2,410,402

UNITED STATES PATENT OFFICE 2,410,402

AXLE SUSPENSION

Joseph Ledwinka, Philadelphia, Pa., assignor to The Budd Company, Philadelphia, Pa., a corporation of Pennsylvania Original application September 17, 1943, Serial No. 502,721. Divided and this application September 12, 1944, Serial No. 553,691

1 Claim. (Cl. 105—224.1)

The invention relates to an axle suspension especially for rail car trucks, and more particularly for the type of trucks which are mainly composed of high-strength sheet metal parts joined together by electric resistance welding.

The features of a truck of the indicated type are more fully disclosed in applicant's application Serial No. 502,721, for Railway truck, filed September 17, 1943, of which the present application is a division.

An object of the invention is a spring suspension which reduces the unsprung weight and which permits the use of wheels secured to and rotatable with their axles as well as the use of wheels which are rotatable on stationary axles.

The features of the invention as well as further objects and advantages thereof will become apparent from the embodiment illustrated in the attached drawings and described in the following:

Figure 1:
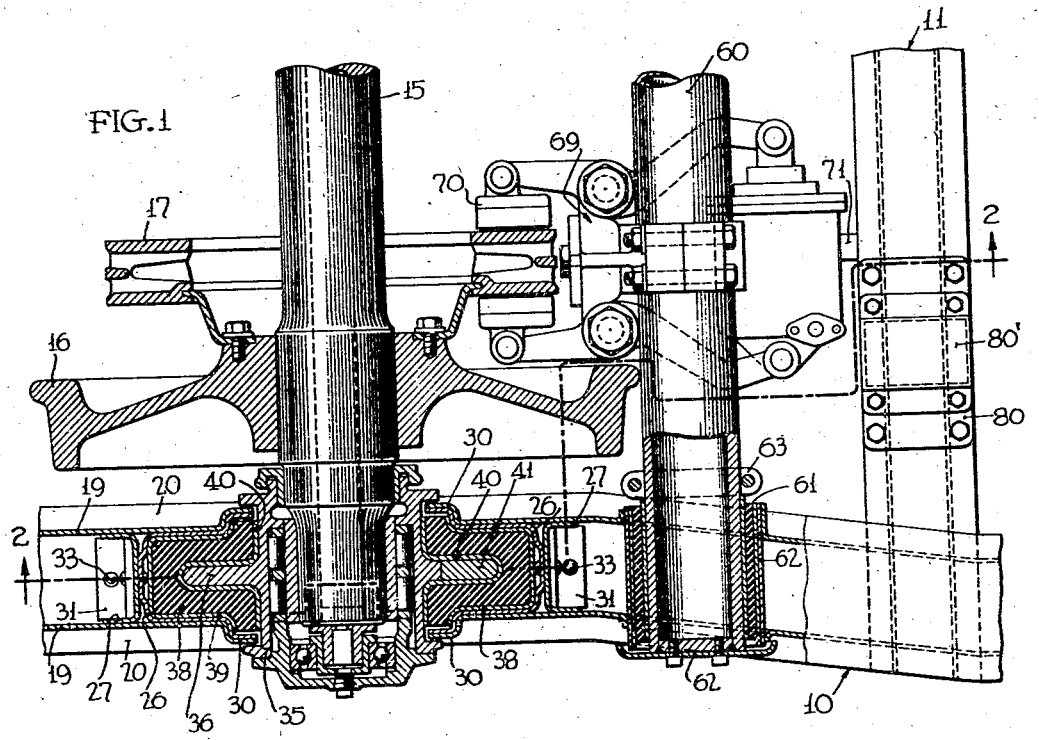
Figure 1 is a fragmentary horizontal section through a truck near one of its ends in a plane passing through the axis of the wheel and showing the spring support for one of the axles.

The truck frame consists mainly of two side frames 10 interconnected by a pair of transoms 11, part of one side frame and one transom being shown in the drawings. 15 are the axles which carry the wheels 16 with brake discs 17.

Each side frame comprises two vertical plates 19 which are spaced from each other and provided with outwardly directed flanges 20 along their margins and around an elongated opening 21 in their central portions. Strips 22, 23 and 24, substantially flat in cross section, are connected, such as by electric welding, to the flanges 20 and interconnect the two plates 19 of each frame 10. The members 19, 22, 23 and 24 form together a system of intercommunicating closed box sectional girders extending nearly throughout the entire length of the frame 10.

At the location of the axles 15, the plates 19 are provided with slots 25 which extend from the underside of the frame upwardly to a point spaced from the upper side of the frame. The plates are interconnected all around said slots by vertical channel members 26, 27 and upper channel members 28, 29. The channel members arranged on the same side of one slot are fastened bottom-to-bottom and have their side walls fitted against and secured, such as by spot welding, to the plates 19. The plates 19 and the deep channels 26 are provided along the margins of the slot with narrow offsets 30 directed outwardly from the interior of the respective side frame. Cast or forged brackets 31 are attached to the lower portions of the bottom walls of the members 26, 27 and serve for the attachment of an anchor plate 32 by means of stay bolts and nuts 33. The brackets 31 and the plate 32 are provided with inter-engaging offsets 34.

Figure 2:
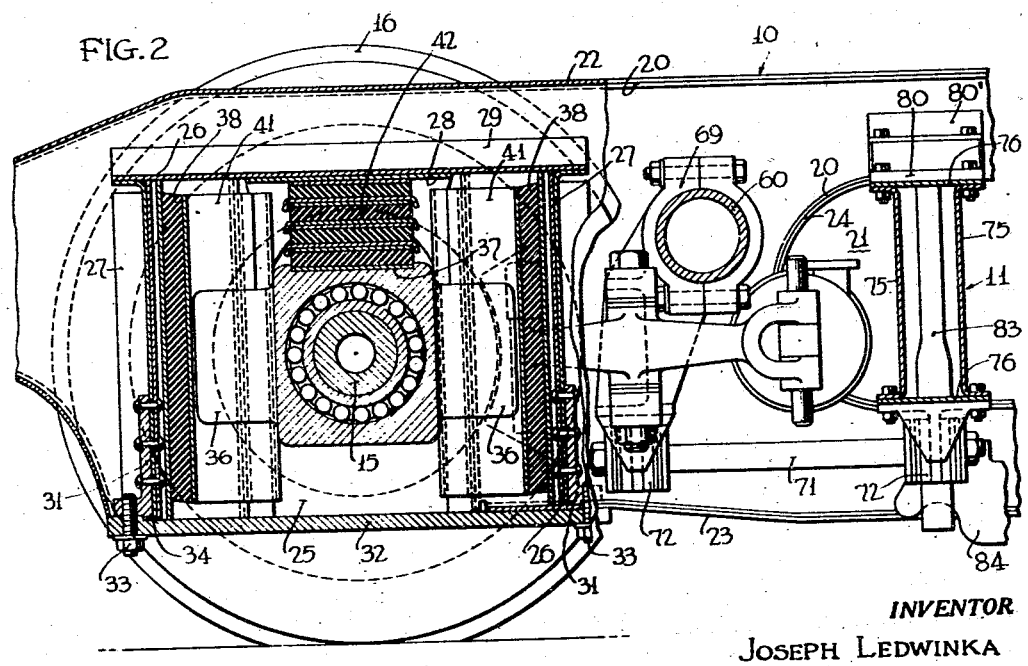
Figure 2 is a section taken along line 2—2 of Figure 1.

The ends of the axle 15 are, in Figures 1 and 2, rotatably supported by anti-friction bearings in axle boxes 35. These axle boxes are provided with longitudinally and vertically extending extensions or fins 36 and a recess 37 on the top.

Generally U-section springs 38 of rubber or the like have their inner and outer surfaces adhesively connected to an outer channel member 39 and an inner channel member 40. The outer member 39 is somewhat longer than the rubber spring 38 and is slipped and fits into the channel 26 so that its upper end rests against the horizontal member 29. The upper portion of the channel in each member 40 is closed by a welded-in block 41. The axle box 37 is secured between and fits with its fins 36 into the channels of the members 40. The upper sides of the fins 36 engage the under side of the filler pieces or blocks 41. A compression sandwich rubber spring 42 is inserted between the recess 37 of the axle box 35 and the bottom of the horizontal channel member 28 and serves for the final adjustment of the load. The springs 38 are stressed in shear under the load transmitted through them from the frame 10 to the axle box 35. The deflection is in proportion to the thickness of the rubber, and the stress is preferably around 45 pounds per square inch.

It will be noted at this point that in this truck equalizer bars are omitted and that the side frames take their place.

On trucks with equalizer bars, these bars rest on top of the journal boxes and, therefore, have no spring suspension and receive all the shocks of the rails, thus increasing the unsprung weight considerably.

Each wheel set with its axle 15 and its axle boxes 35, can easily be removed by simply taking off the anchor plate 32 and by lifting the frame. Similarly, a new axle may be inserted.

Figure 3:
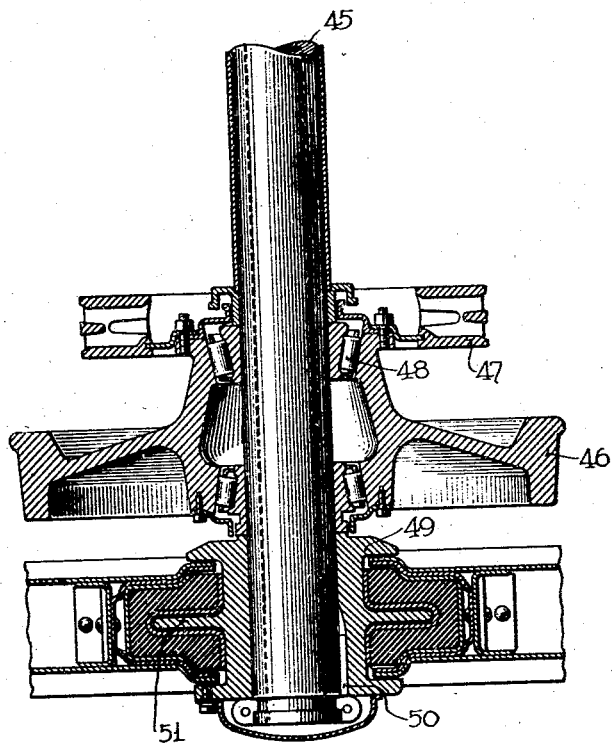
Figure 3 is a section corresponding to part of Figure 1 yet showing a different type of axle and wheel support.

Instead of the rotating axle as shown in Figures 1 and 2, the same frame may be provided, without any alterations, with the axle and wheel unit shown in Figure 3 which comprises the axle 45, wheels 46 with brake disc 47 supported on the axle by roller bearings 48, and an end piece 49 which is keyed at 50 to the axle, and the outer contours of which are substantially identical with the contours of the axle box 35 including the provision of fins 51.

The springs 38 do not only serve for supporting the frame on the axle but they also transmit stresses in longitudinal and transverse direction so that there is no metal-to-metal connection whatever.

All minor shocks are absorbed by the described rubber units and are not transmitted to the frame. At the same time, the noises from the rails through axles and wheels are prevented from passing furth r by these units.

Only if excessive shocks have to be transmitted, will the axle box or its lateral flanges engage the offset portions 30 of the frame plates 10.

On each side of the truck between the wheels 16 and the transom 11 is a tubular transverse member 60 which extends through openings in the walls 19 and is secured in the latter by metal bushings and a rubber sleeve 61. The outer metal sleeve 62 is welded into the openings of and forms an additional transverse connection between the plates 19. Lateral movement of the tube 60 is limited by collars 63, a removable plate 64 at one end and a bracket (not shown) at the other end. The tubes 60 carry brake units 69 with cylinder, actuating arms and brake shoes 70 for each wheel. The torsional forces exerted on the brake unit are taken up and the brake is held in place by a torque rod 71 which is inserted by means of rubber cushions 72 between downward extensions or brackets respectively of the brake unit and the transom 11. This brake support forms the subject matter of a copending application Serial No. 694,796 filed September 4, 1946, and need not be further described herein.

Each transom 11 consists of two plates 75 which are spaced from each other in the longitudinal direction of the truck and have their marginal flanges connected to top and bottom plates 76. The ends of the transoms 11 fit into the opening 21 and are attached to the side frames by means of rivets (not shown) which extend through the overlapping portions of the plates 19 and 23 and of the plates 75, 76.

Each transom 11 carries near each of its ends a bearing 80 which supports a head of a swing hanger 83, the shank of which extends through openings in the bearing 80, through openings of the walls 76 and through the space between the side walls 75 of the transom 11. The head of the hanger 83 is enclosed by a casing 80'.

Each pair of links 83 carries in openings of their lower ends a bridging member 84 serving for the support of the bolster (not shown).

The invention is especially designated for high strength construction, preferably of cold rolled stainless sheet steel, the parts of which are welded together by electric spot welding. It will be understood that the invention is not restricted to the specific embodiment illustrated in the drawings and described hereinbefore but that many modifications will occur to those skilled in the art. All such modifications are intended to be covered by the attached claim.

What is claimed is:

In a truck for railway cars, a frame, an end supporting member for an axle such as an axle box, vertically and longitudinally extending fins or narrow projections extending transversely to and on each side of the axle in the direction of travel on said end member, members of resilient material such as rubber provided with a vertical slot each having their outer surfaces and the walls of said slot lined with and adhesively attached to U-section metal members, said fins or projections of the end member fitting into and being held by the metal members lining the slots whereas the outer metal members are supported in the frame.

JOSEPH LEDWINKA.